US010444570B2

(12) United States Patent
Tong et al.

(10) Patent No.: US 10,444,570 B2
(45) Date of Patent: Oct. 15, 2019

(54) TRANSFER PRINTING PLATE AND TRANSFER PRINTING DEVICE

(71) Applicants: BOE TECHNOLOGY GROUP CO., LTD., Beijing (CN); Ordos Yuansheng Optoelectronics Co., Ltd., Ordos, Inner Mongolia (CN)

(72) Inventors: Jie Tong, Beijing (CN); Peimao Li, Beijing (CN); Xuelu Wang, Beijing (CN); Huilian Wang, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 112 days.

(21) Appl. No.: 15/552,287

(22) PCT Filed: Feb. 22, 2017

(86) PCT No.: PCT/CN2017/074430
§ 371 (c)(1),
(2) Date: Aug. 20, 2017

(87) PCT Pub. No.: WO2018/000837
PCT Pub. Date: Jan. 4, 2018

(65) Prior Publication Data
US 2018/0239178 A1   Aug. 23, 2018

(30) Foreign Application Priority Data
Jun. 29, 2016   (CN) .................... 2016 2 0661366 U (51) Int. Cl.
*G02F 1/1337* (2006.01)

(52) U.S. Cl.
CPC .................................. *G02F 1/1337* (2013.01)

(58) Field of Classification Search
CPC ............ G02F 1/1337; G02F 1/133723; G02F 1/13378
See application file for complete search history.

(56) References Cited

U.S. PATENT DOCUMENTS

2015/0234222 A1* 8/2015 Ma .................... G02F 1/133723
445/24

FOREIGN PATENT DOCUMENTS

| CN | 101354499 A | 1/2009 |
| CN | 101661194 A | 3/2010 |

(Continued)

OTHER PUBLICATIONS

International Search Report and Written Opinion (including English translation of Box V.) dated May 27, 2017, for corresponding PCT Application No. PCT/CN2017/074430.

*Primary Examiner* — Thanh Nhan P Nguyen
(74) *Attorney, Agent, or Firm* — Kinney & Lange, P.A.

(57) ABSTRACT

A transfer printing plate is disclosed. The transfer printing plate is configured for transferring an alignment liquid to a mainboard of a display panel and may include: a base plate; a transfer printing portion formed on the base plate and comprising at least two strip-shaped protrusions arranged side by side and spaced apart by a predetermined distance; and a supporting and connecting portion formed between two adjacent strip-shaped protrusions of the at least two strip-shaped protrusions and connected to the two adjacent strip-shaped protrusions. A transfer printing device having the transfer printing plate is also disclosed.

18 Claims, 7 Drawing Sheets

(56) References Cited

FOREIGN PATENT DOCUMENTS

| | | |
|---|---|---|
| CN | 104793400 A | 7/2015 |
| CN | 104834130 A | 8/2015 |
| CN | 205750181 U | 11/2016 |
| KR | 101041616 B1 | 6/2011 |

* cited by examiner

TRANSFER PRINTING PLATE AND TRANSFER PRINTING DEVICE

CROSS REFERENCE TO RELATED APPLICATIONS

This application is a Section 371 National Stage Application of International Application No. PCT/CN2017/074430, filed on 22 Feb. 2017, entitled "TRANSFER PRINTING PLATE AND TRANSFER PRINTING DEVICE", which claims priority to Chinese Application No. 201620661366.8, filed on 29 Jun. 2016, incorporated herein by reference in its entirety.

TECHNICAL FIELD

The present application relates to the field of display technologies, and especially to a transfer printing plate and a transfer printing device for transferring an alignment liquid onto a display panel.

BACKGROUND

A transfer printing plate is used to transfer an alignment liquid to a mainboard of a display panel. However, during transfer printing, the alignment liquid printed on the mainboard of the display panel may not be uniformly distributed due to various reasons, leading to defects such as a Mura defect.

SUMMARY

In order to overcome or at least alleviate the problems in prior arts, the present disclosure provides a transfer printing plate and a transfer printing device.

According to an aspect of the present disclosure, there is provided a transfer printing plate for transferring an alignment liquid onto a mainboard of a display panel.

According to an exemplary embodiment, the transfer printing plate may comprise: a base plate; a transfer printing portion formed on the base plate and comprising at least two strip-shaped protrusions arranged side by side and spaced apart by a predetermined distance; and a supporting and connecting portion formed between two adjacent strip-shaped protrusions of the at least two strip-shaped protrusions and connected to the two adjacent strip-shaped protrusions.

In a further embodiment, in the transfer printing portion, a height of the supporting and connecting portion in a direction perpendicular to the base plate is equal to a height of the strip-shaped protrusion in the direction.

In a further embodiment, a plurality of the supporting and connecting portions are formed between the two adjacent strip-shaped protrusions; each strip-shaped protrusion comprises a plurality of transfer printing sections arranged in a longitudinal direction of the strip-shaped protrusion; and one end of each supporting and connecting portion is connected to a border between two adjacent transfer printing sections of one of the two adjacent strip-shaped protrusions.

In a further embodiment, the other end of each supporting and connecting portion is connected to a border between two adjacent transfer printing sections of the other one of the two adjacent strip-shaped protrusions; and a region surrounded by the adjacent strip-shaped protrusions and adjacent supporting and connecting portions corresponds to a non-display region of the mainboard of the display panel.

In a further embodiment, the two adjacent strip-shaped protrusions comprise a first strip-shaped protrusion and a second strip-shaped protrusion; the supporting and connecting portions comprise a first supporting and connecting portion formed between a corner at a first end of the first strip-shaped protrusion and a corner at one corresponding end of the second strip-shaped protrusion, and/or a second supporting and connecting portion formed between a corner at a second end of the first strip-shaped protrusion and a corner at the other corresponding end of the second strip-shaped protrusion.

In a further embodiment, each of the two adjacent strip-shaped protrusions is a protrusion configured to transfer the alignment liquid to the mainboard of the display panel.

In a further embodiment, one of the two adjacent strip-shaped protrusions is a protrusion configured to transfer the alignment liquid to the mainboard of the display panel, while the other one is a protrusion configured only to provide a supporting function; and heights of the two adjacent strip-shaped protrusions in a direction perpendicular to the base plate are equal to each other.

In a further embodiment, an orthographic projection of the supporting and connecting portion on the base plate has a shape having a width gradually increasing from a center thereof to two ends thereof connected to the two adjacent strip-shaped protrusions.

In a further embodiment, an orthographic projection of the supporting and connecting portion on the base plate is rectangular.

In a further embodiment, an extending direction of the strip-shaped protrusions is perpendicular to a printing direction and an extending direction of the supporting and connecting portion is parallel with the printing direction.

In a further embodiment, an extending direction of the strip-shaped protrusions is not perpendicular to a printing direction and an extending direction of the supporting and connecting portion is at an angle with respect to the printing direction.

According to another aspect of the present disclosure, there is provided a transfer printing device.

In an exemplary embodiment, the transfer printing device may comprise any one of the above-described transfer printing plates.

DETAILED DESCRIPTION OF EMBODIMENTS

In order to make objects, technical solutions and advantages of the present disclosure more apparent, the present disclosure will be described in detail in connection with specific embodiments with reference to the accompanying drawings.

To be noted that, implementations that are not shown in the drawings or not described in the description are known to a person of ordinary skills in the art, so that they are not described in detail. Moreover, described components are not limited to specific forms, shapes or modes mentioned in the embodiments, and they may be easily modified or changed by a person of ordinary skills in the art.

Directional terms such as "up", "down", "front", "rear", "left", "right" and the like used in the embodiments are intended to indicate directions in the drawings, instead of limiting the scope of the present disclosure.

Existing problem and its causes of formation will be described with reference to FIGS. 1-6.

Figure 1:
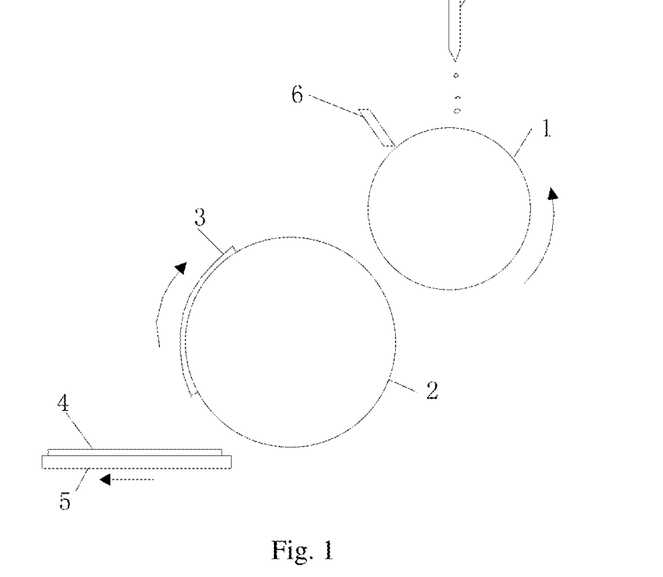
FIG. 1 is an illustrative drawing showing an exemplary alignment liquid transfer printing system and its operating process.

FIG. 1 is an illustrative drawing showing an exemplary alignment liquid transfer printing system and its operating process.

As shown in FIG. 1, a process of transferring an alignment liquid includes: rotating an anilox roller 1 in a counterclockwise direction, rotating a transfer roller 2 in a clockwise direction such that a transfer printing plate 3 provided thereon is rotated in the clockwise direction; dropping an alignment liquid onto to the roller 1 through a nozzle 7, and scrapping the surface of the roller 1 by a scraper 6, such that the alignment liquid is distributed uniformly; transferring the alignment liquid onto the transfer printing plate 3 when the transfer printing plate 3 contacts the roller 1; moving a mainboard 4 of a display panel leftwards on a platform 5, and transferring the alignment liquid onto the mainboard 4 when the transfer printing plate 3 contacts the mainboard 4 on the platform 5, such that an alignment film is formed on the mainboard 4.

Figure 2:
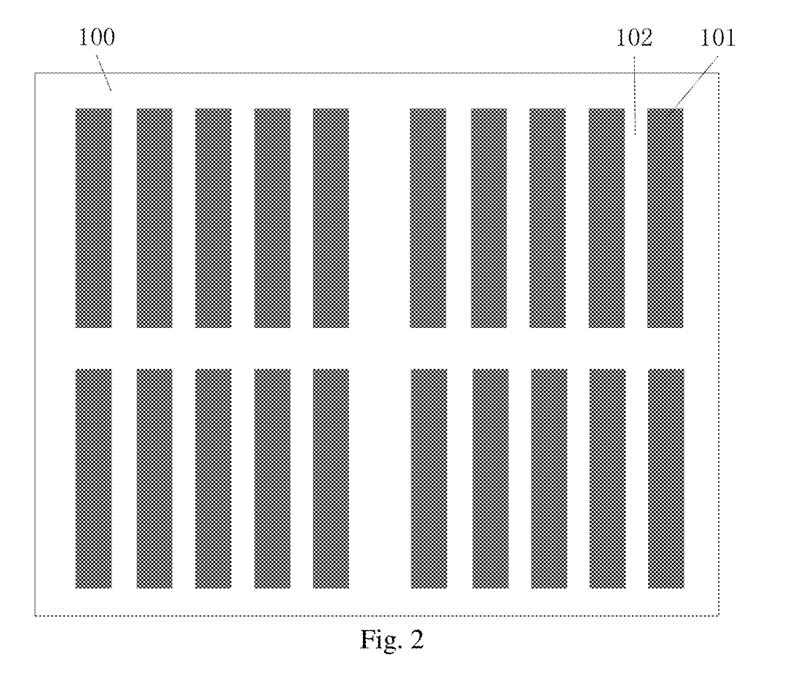
FIG. 2 is an illustrative structure drawing of a transfer printing plate shown in FIG. 1, showing a plurality of strip-shaped protrusions.

An exemplary alignment liquid transfer printing plate is shown in FIG. 2. The transfer printing plate includes a base plate 100 and a plurality of transfer printing portions formed on base plate 100. Each transfer printing portion includes a plurality of strip-shaped protrusions 101. An interval 102 exists between adjacent strip-shaped protrusions 101.

Figure 3A:
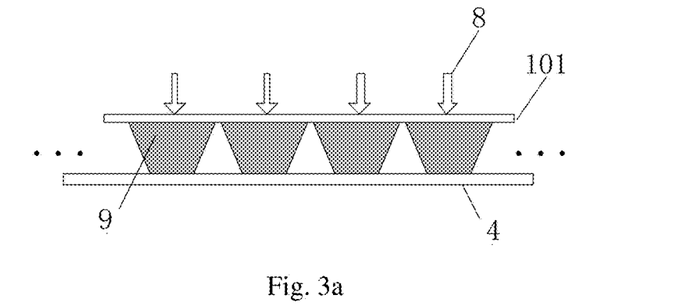
FIG. 3a is an illustrative drawing showing forces applied at dots in a central region of the strip-shaped protrusion of FIG. 2.
Figure 3B:
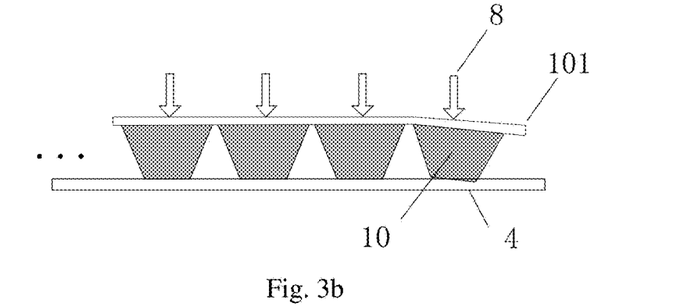
FIG. 3b is an illustrative drawing showing forces applied at dots in a peripheral region of the strip-shaped protrusion of FIG. 2.

Each strip-shaped protrusion includes a large number of dots arranged in a predetermined form. FIGS. 3a and 3b are illustrative drawings showing forces applied at dots in a central region and a peripheral region of one strip-shaped protrusion, respectively.

As shown in FIGS. 3a and 3b, when performing a transfer printing operation, a printing force 8 is applied onto the base plate 100, such that the strip-shaped protrusions 101 transfer an alignment liquid onto the mainboard 4. Compared with the center region of the strip-shaped protrusion, a peripheral region (especially at positions of the outmost dots) of the strip-shaped protrusion is subject to different support forces at its two sides, leading to different deformation amounts of the dot 10 at edge regions and the dot 9 at the central region of the strip-shaped protrusion, thus, a circumstance of the transfer printed alignment film having a non-uniform thickness at the edge regions thereof occurs.

Figure 4:
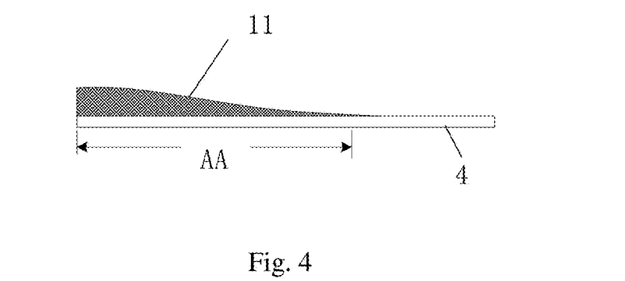
FIG. 4 is an illustrative drawing showing an alignment film located at a peripheral region of a display region and having a non-uniform thickness.

As shown in FIG. 4, as to a display panel having a narrow bezel design, its alignment film 11 has a relative small width at its edge regions, therefore, no sufficient space can be left for compensating an edge region of the alignment film 11 having a non-uniform thickness. Thus, the circumstance of the alignment film having a non-uniform thickness will also occurs at an edge region of a display region AA, causing Mura defect at the edge region of the display region AA of the display panel.

Figure 5:
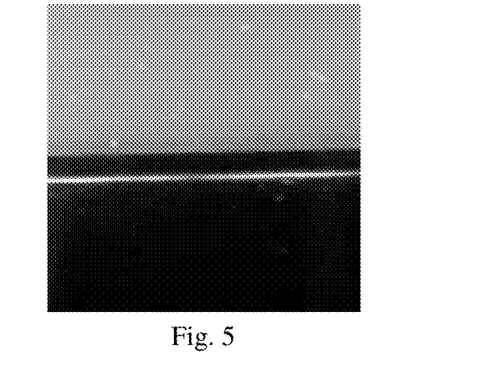
FIG. 5 is an illustrative drawing showing a Mura defect located at an edge of a display panel and caused by an alignment film having a non-uniform thickness.
Figure 6:
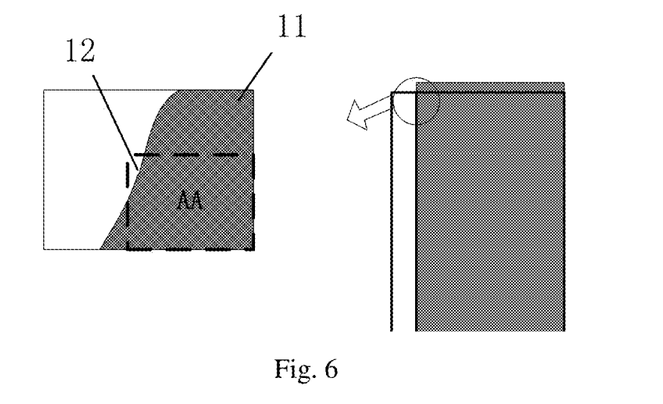
FIG. 6 is an illustrative drawing showing that a boundary at a corner of the alignment film has entered the display region.

FIG. 5 shows a Mura defect located at an edge of the display panel and caused by non-uniform thickness of an alignment film. Further, the transfer printing plate will be stretched during transfer printing, and a corner of the strip-shaped protrusion will be under a combined action of different support forces at two sides thereof and the stretching, such that a corner of the alignment film will shrink. As shown in FIG. 6, a boundary 12 of a corner of the alignment film falls within the display region AA, which further leads to defect in displaying of the display panel.

Figure 7:
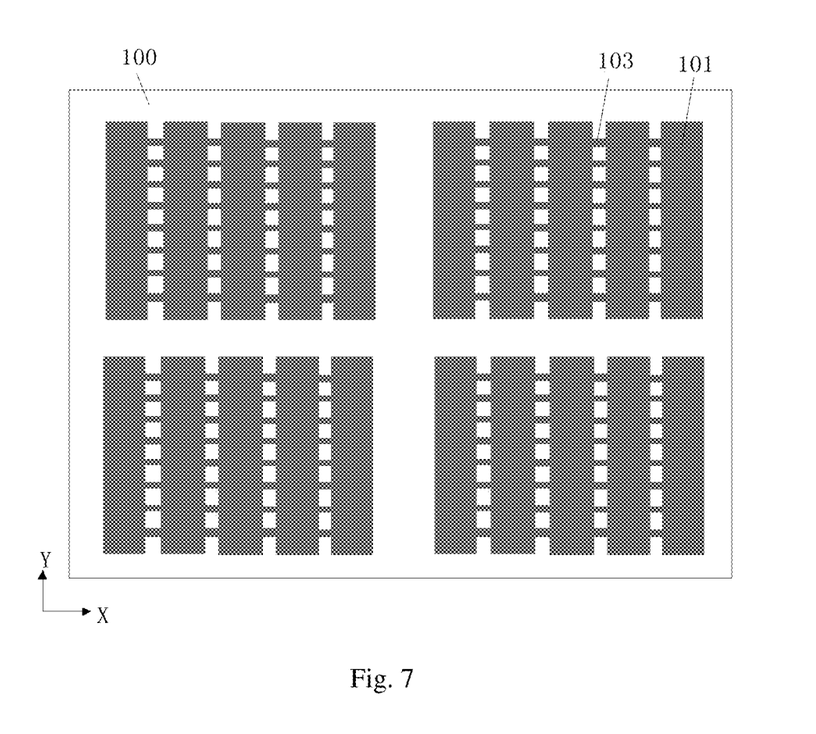
FIG. 7 is an illustrative structural drawing showing a transfer printing plate according to a first embodiment of the present disclosure.

FIG. 7 is an illustrative structural drawing showing a transfer printing plate according to a first embodiment of the present disclosure. As shown in FIG. 7, the transfer printing plate includes: a base plate 100; and four transfer printing portions formed on the base plate. The four transfer printing portions have the same area and are located at an upper-left portion, an upper-right portion, a lower-left portion and a lower-right portion of the base plate, respectively. In other embodiments that are not shown, there may be more or less transfer printing portions, and a plurality of transfer printing portions may be arranged in various forms.

Each of the transfer printing portions includes five strip-shaped protrusions 101 arranged side by side in a printing direction (i.e., the X direction in FIG. 1), each strip-shaped protrusion 101 extends in a direction (i.e., the Y direction in FIG. 1) perpendicular to the printing direction, a predetermined distance is provided between adjacent strip-shaped protrusions 101, and eight supporting and connecting portions 103 are formed between adjacent strip-shaped protrusions 101. The eight supporting and connecting portions 103 are arranged in the direction in which the strip-shaped protrusions extend, each supporting and connecting portion 103 extends in the printing direction and two ends thereof in the printing direction are connected to two adjacent strip-shaped protrusions 101 respectively. In other embodiments, each transfer printing portion may have more or less strip-shaped protrusions, and these strip-shaped protrusions may be arranged in various forms, which will be set forth hereinafter. Moreover, more or less supporting and connecting portions may be formed between adjacent two strip-shaped protrusions, which will be described hereinafter.

During transferring alignment liquid to the mainboard, the transfer printing plate of the present disclosure will be fixedly mounted on a transfer roller of a transfer device. The transfer roller drives the transfer printing plate to rotate, the mainboard moves in a direction perpendicular to an axis of the transfer roller, the printing direction is defined as the X direction of FIG. 7, i.e., the direction in which the mainboard moves; the direction perpendicular to the printing direction is the axis direction of the transfer roller and is defined as the Y direction of FIG. 7. Directions in other drawings are defined similarly.

In the present embodiment, the strip-shaped protrusion 101 is a rectangular shaped protrusion and its orthographic projection on the base plate 100 is a rectangle. The supporting and connecting portion 103 is also a rectangular protrusion, and its orthographic projection on the base plate 100 is also a rectangle. In other embodiments, the strip-shaped protrusion and/or the supporting and connecting portion may have other shapes, which will be described hereinafter.

As mentioned above, in the transfer printing plate according to the first embodiment of the present disclosure, supporting and connecting portions are formed between adjacent strip-shaped protrusions, two ends of each supporting and connecting portion are connected to the two adjacent strip-shaped protrusions, and supporting and connecting portions provide a supporting function. During transfer printing, due to existence of the supporting and connecting portions, support forces applied at two lateral edge portions of the strip-shaped protrusion are suitably balanced, thus there will be no big difference in deformation amounts of the edge portion and the central portion of the strip-shaped protrusion, so that the thickness of the printed alignment film will be more uniform, quality of the alignment film is improved, and Mura defect is reduced.

In a different embodiment, in a direction perpendicular to the plane of the base plate, a height of the supporting and connecting portion is preferably equal to the height of a height of the strip-shaped protrusion. Of course, the height of the supporting and connecting portion may also be slightly larger or smaller than the height of the strip-shaped protrusion. By setting the height of the supporting and connecting portion to be equal to the height of the strip-shaped protrusion, support forces at two lateral edges portions of the strip-shaped protrusion may be best balanced, and quality of the transferred alignment film is improved.

It can be appreciated that, considering of factors such as sizes of the transfer printing plate and sizes of the display penal, the base plate may include one or more transfer printing portions, areas of respective transfer printing portion may be the same or different, each transfer printing portion may include at least two strip-shaped protrusions, and one or more supporting and connecting portions may be formed between adjacent strip-shaped protrusions. The number of the supporting and connecting portions may be determined based on factors such as the length of the strip-shaped protrusion, the interval between adjacent strip-shaped protrusions, printing effects and the like.

Figure 8:
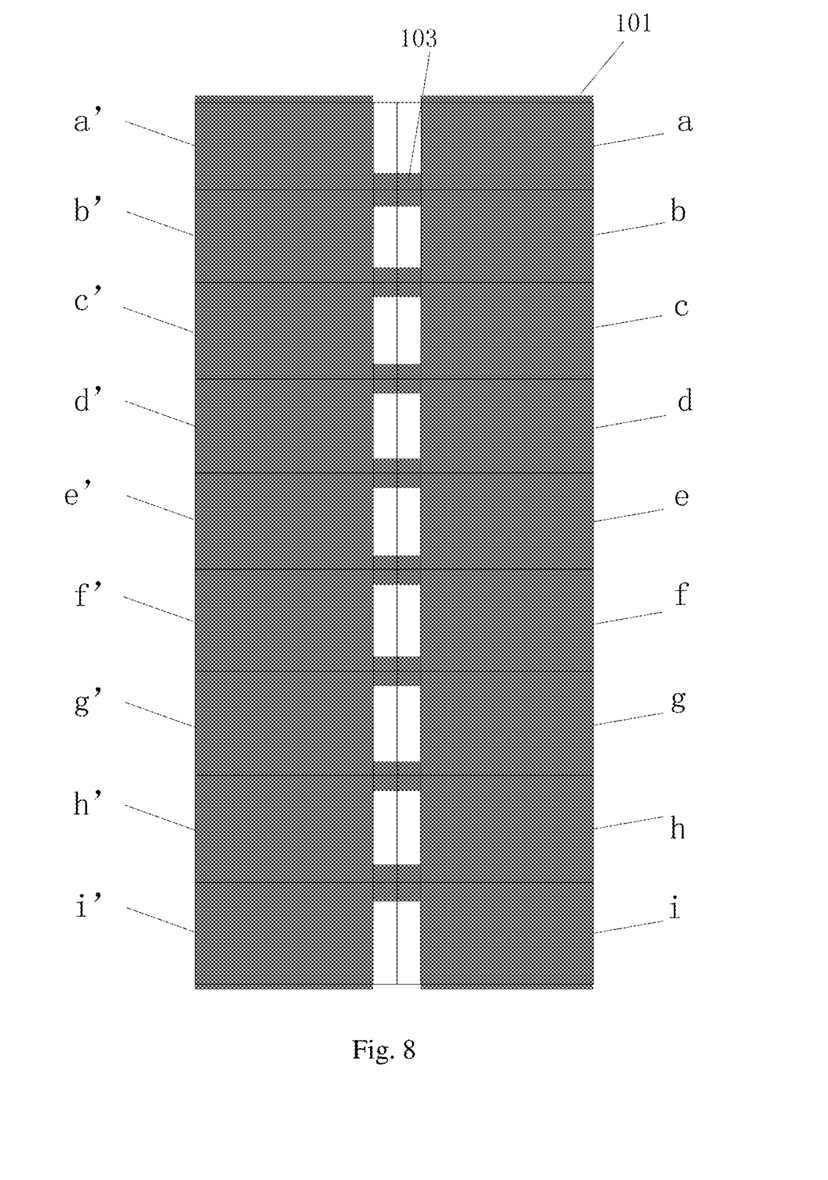
FIG. 8 is an illustrative structural drawing showing any two adjacent strip-shaped protrusions of a transfer printing plate according to a second embodiment of the present disclosure.

FIG. 8 shows two adjacent strip-shaped protrusions of a transfer printing plate according to a second embodiment of the present disclosure. However, a person of ordinary skills in the art could understand that the principle shown in FIG. 8 can be applied to each of the transfer printing portions and more strip-shaped protrusions. For the sake of simplification, detailed description of technical features in FIG. 8 that are identical to those of FIG. 7 will be omitted. Each of the strip-shaped protrusions are divided into nine transfer printing sections in its extending direction, the right strip-shaped protrusion in the figure is divided into nine transfer printing sections a, b, c, d, e, f, g, h and i, and the left strip-shaped protrusion is divided into nine transfer printing sections a', b', c', d', e', f', g', h' and i', each of the transfer printing sections corresponds to a region of the mainboard of the display panel. That is, when the transfer printing plate is used to transfer an alignment liquid to the mainboard of the display panel, each transfer printing section of the strip-shaped protrusion transfers the alignment liquid to one region of the display panel. Each strip-shaped protrusion may print nine regions of the display panel in one operation. A first end of a supporting and connecting portion between two adjacent strip-shaped protrusions of the transfer printing plate is located at a border between two adjacent transfer printing sections of one of the two adjacent strip-shaped protrusions, and a second end of the supporting and connecting portion is located at a border between two adjacent transfer printing sections of the other of the two adjacent strip-shaped protrusions, where positions of the two adjacent transfer printing sections of one of the strip-shaped protrusions correspond to positions of the two adjacent transfer printing sections of the other of the strip-shaped protrusions respectively. In FIG. 8, two ends of the first supporting and connecting portion are connected to the border between the sections a, b and the border between the sections a', b' respectively. Similarly, two ends of the second supporting and connecting portion are connected to the border between the sections b, c and the border between the sections b', c' respectively; two ends of the third supporting and connecting portion are connected to the border between the sections c, d and the border between the sections c', d' respectively; two ends of the fourth supporting and connecting portion are connected to the border between the sections d, e and the border between the sections d', e' respectively; two ends of the fifth supporting and connecting portion are connected to the border between the sections e, f and the border between the sections e', f' respectively; two ends of the sixth supporting and connecting portion are connected to the border between the sections f, g and the border between the sections f', g' respectively; two ends of the seventh supporting and connecting portion are connected to the border between the sections g, h and the border between the sections g', h' respectively; two ends of the eighth supporting and connecting portion are connected to the border between the sections h, i and the border between the sections h', i' respectively. A region surrounded by the two adjacent strip-shaped protrusions and adjacent supporting and connecting portions corresponds to a non-display region of the mainboard of the display panel.

In this embodiment, each of two ends of the supporting and connecting portion of the transfer printing plate is formed at border between adjacent transfer printing sections of a strip-shaped protrusion, that is, the supporting and connecting portion is connected to the corners of the transfer printing sections, regions between adjacent supporting and connecting portions correspond to edges of the transfer printing section except the corners, i.e., corresponding to the non-display region of the mainboard where driving chip binding pins and panel testing points are provided. In such a manner, not only uniformity of thickness of the alignment film is improved, but also no interference between the printed alignment film and the driving chip binding pins and panel testing points will occur, and binding and testing of the display panel will not be influenced.

It can be understood that, in other embodiments that are not shown, each strip-shaped protrusion may be divided into more or less transfer printing sections. Based on factors such as sizes of the transfer printing plate and sizes of the display panel, each strip-shaped protrusion may be divided into one or more transfer printing sections. When it is needed to print on display panels of the same sizes, transfer printing sections of each strip-shaped protrusion have the same sizes, and the supporting and connecting portions are uniformly arranged in the direction in which the strip-shaped protrusion extends. When it is needed to print on display panels of different sizes, transfer printing sections of each strip-shaped protrusion have different sizes, and accordingly, the supporting and connecting portions are non-uniformly arranged in the direction in which the strip-shaped protrusion extends. Additionally, sizes of the transfer printing sections of one strip-shaped protrusion may be different from those of the transfer printing sections of another strip-shaped protrusion. Positions and number of the supporting and connecting portions may be determined or adjusted based on positions and number of the transfer printing sections.

Figure 9:
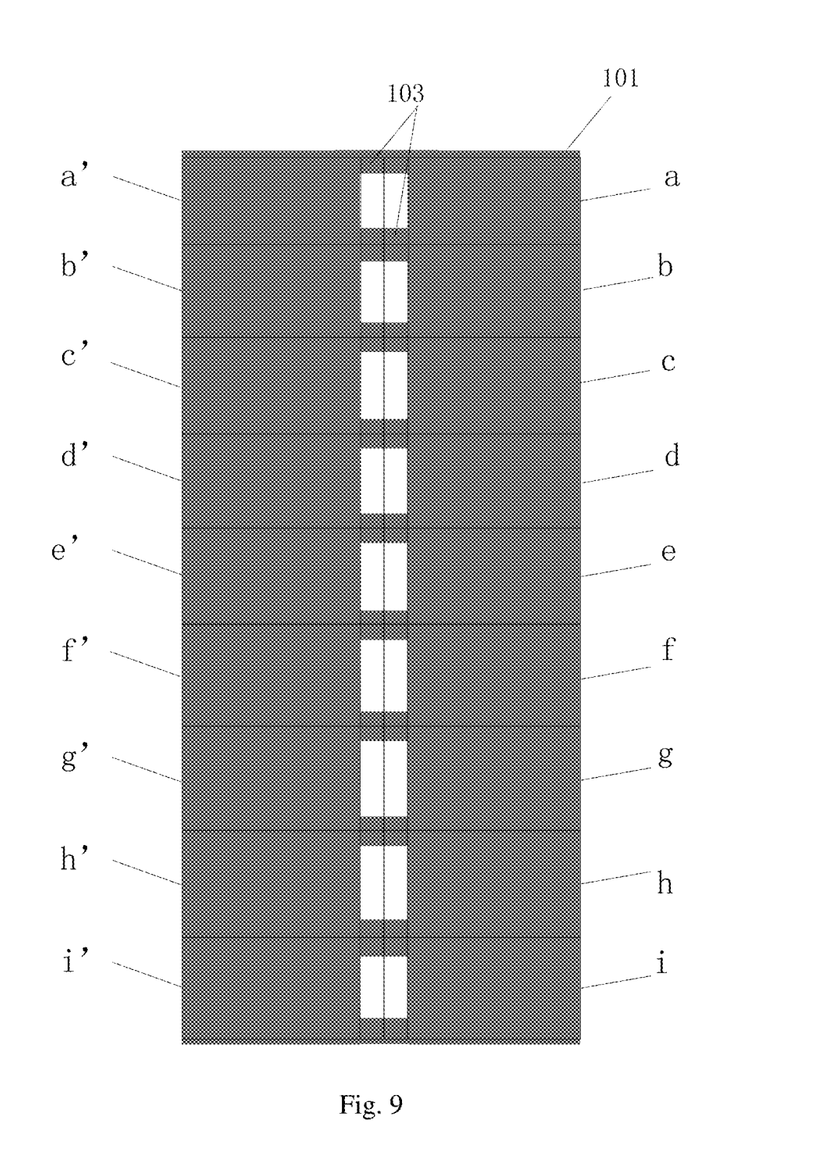
FIG. 9 is an illustrative structural drawing showing any two adjacent strip-shaped protrusions of a transfer printing plate according to a third embodiment of the present disclosure.

FIG. 9 shows two adjacent strip-shaped protrusions of a transfer printing plate according to a third embodiment of the present disclosure. However, a person of ordinary skills in the art could understand that the principle shown in FIG. 9 can be applied to each of the transfer printing portions and more strip-shaped protrusions. For the sake of simplification, detailed description of technical features in FIG. 9 that are identical to those of FIG. 7 or 8 will be omitted.

As shown in FIG. 9, a supporting and connecting portion is formed between a corner of one of two adjacent strip-shaped protrusions at one end thereof and a corner of the other one of the two adjacent strip-shaped protrusions at a corresponding end thereof, and another supporting and connecting portion is also formed between a corner of the one of two adjacent strip-shaped protrusions at the other end thereof and a corner of the other one of the two adjacent strip-shaped protrusions at a corresponding end thereof. That is, two ends of each supporting and connecting portion are connected to the corners of two corresponding ends of the two adjacent strip-shaped protrusions. As shown in FIG. 9, a supporting and connecting portion is formed between the corner of the right strip-shaped protrusion at one end thereof (i.e., a corner of the transfer printing section a) and the corner of the left strip-shaped protrusion at a corresponding end thereof (i.e., a corner of the transfer printing section a'), and similarly, a supporting and connecting portion is formed between the corner of the right strip-shaped protrusion at the other end thereof (i.e., a corner of the transfer printing section i) and the corner of the left strip-shaped protrusion at a corresponding end thereof (i.e., a corner of the transfer printing section i').

The transfer printing plate will be stretched during transfer printing, and the corner of the strip-shaped protrusion will be under a combined action of unbalanced support forces at two sides thereof and the stretching, thus, the corner of the alignment film will shrink, so the boundary of the corner of the alignment film will fall within the display region, which further leads to defect in displaying of the display panel. In the transfer printing plate according to the present embodiment, through utilizing the supporting and connecting portion to extend and protect the corner of the strip-shaped protrusion, two ends of the strip-shaped protrusion corresponding to the corners of the display region can provide an increased area for transfer printing, a corner of a printed alignment film is enlarged, and the defect in displaying caused by the corner of the alignment film falling within the display region can be avoided.

It can be understood that the transfer printing plate in the present embodiment can be regarded as the transfer printing plate of the second embodiment provided with additional supporting and connecting portions connecting corners of the adjacent strip-shaped protrusions at their corresponding ends. In the case that each strip-shaped protrusion has only one transfer printing section, it is possible that only the supporting and connecting portions connecting the corners of the adjacent strip-shaped protrusions at corresponding ends thereof are provided.

Figure 10:
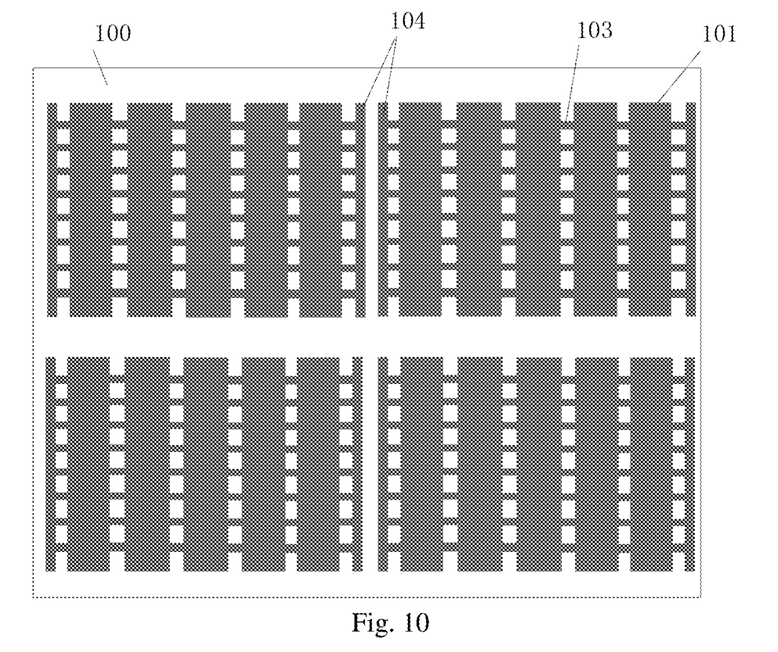
FIG. 10 is an illustrative structural drawing showing a transfer printing plate having a dummy protrusion according to a fourth embodiment of the present disclosure.

FIG. 10 shows a transfer printing plate according to a fourth embodiment of the present disclosure. For the sake of simplification, detailed description of technical features of FIG. 10 that are identical to those of FIGS. 7 to 9 will be omitted. Compared to the transfer printing plate shown in FIG. 7, the transfer printing plate of the present embodiment further comprises an additional dummy protrusion 104, as shown in FIG. 10. The dummy protrusion 104 and an outmost strip-shaped protrusion of the transfer printing portion are arranged side by side and spaced apart from each other by a predetermined distance, and at least one supporting and connecting portion is formed between the dummy protrusion 104 and an the outmost strip-shaped protrusion.

The dummy protrusion 104 can be used only to provide support to an associated strip-shaped protrusion, and does not transfer alignment liquid.

A plurality of supporting and connecting portions may be formed between the dummy protrusion 104 and the outmost strip-shaped protrusion of the transfer printing portion, one end of each supporting and connecting portion is located at a border between two adjacent transfer printing sections of the outmost strip-shaped protrusion and/or at a corner of the outmost strip-shaped protrusion. A region surrounded by the dummy protrusion 104, the outmost strip-shaped protrusion and two adjacent supporting and connecting portions corresponds to a non-display region of the mainboard of the display panel.

In a direction perpendicular to the base plate, a height of the dummy protrusion may be larger than, equal to or smaller than a height of the strip-shaped protrusion, and preferably, the height of the dummy protrusion is equal to the height of the strip-shaped protrusion.

In the transfer printing plate according to the fourth embodiment of the present disclosure, the dummy protrusion makes the transfer printing plate much flatter in whole, the support forces for the strip-shaped protrusion become more balanced in general, which helps to improve quality of the printed alignment film. Moreover, the supporting and connecting portion between the dummy protrusion and the strip-shaped protrusion makes support forces applied at two lateral sides of the outmost strip-shaped protrusion more balanced, so that uniformity of thickness of the alignment film printed by the outmost strip-shaped protrusion is improved, quality of the printed alignment film is further improved, and Mura defect is alleviated.

Although the dummy protrusion according to the present embodiment of the present disclosure is located at an outer side of the outmost strip-shaped protrusion, the present disclosure is not limited thereto. In other embodiments that are not shown, the dummy protrusion may also be located between two adjacent strip-shaped protrusions, and supporting and connecting portions are provided between the dummy protrusion and each of the two adjacent strip-shaped protrusions. In another embodiment that is not shown, the dummy protrusion may also be located at a position of a strip-shaped protrusion, so as to replace the strip-shaped protrusion.

Figure 11:
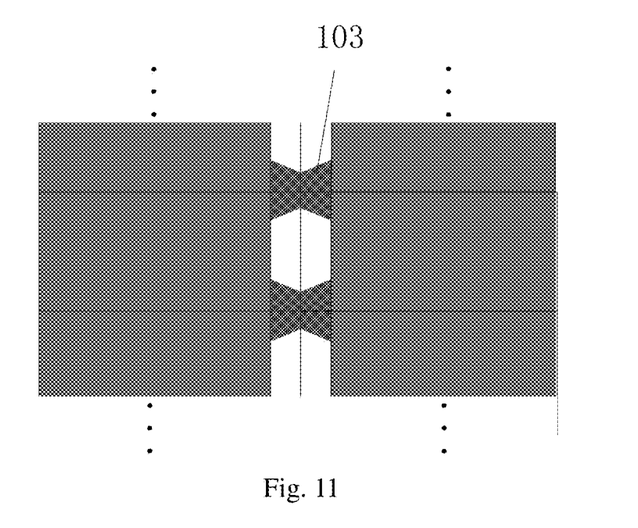
FIG. 11 is a first illustrative structural drawing showing a transfer printing plate according to a fifth embodiment of the present disclosure, where the transfer printing plate includes a supporting and connecting portion having a width gradually increases from the centre to both sides thereof.
Figure 12:
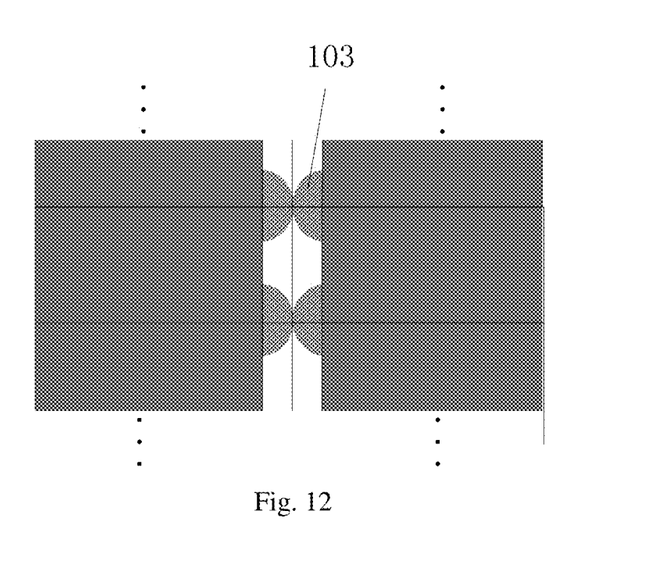
FIG. 12 is a second illustrative structural drawing showing a transfer printing plate according to a fifth embodiment of the present disclosure, where the transfer printing plate includes a supporting and connecting portion having a width gradually increases from the centre to both sides thereof.

Each of FIGS. 11 and 12 shows any two adjacent strip-shaped protrusions of a transfer printing plate according to a fifth embodiment of the present disclosure. However, a person of ordinary skills in the art could understand that the principle shown in FIGS. 11 and 12 can be applied to each of the transfer printing portions and more strip-shaped protrusions. For the sake of simplification, detailed description of technical features in FIGS. 11 and 12 that are identical to those of FIGS. 7 to 10 will be omitted. In the present embodiment, the supporting and connecting portion 103 may have a shape having a width gradually increasing from a center thereof to two adjacent strip-shaped protrusions, instead of being a rectangular protrusion. A projection of the supporting and connecting portion on the base plate 100 is in a shape gradually widening from the center thereof to the two adjacent strip-shaped protrusions. For example, as shown in FIG. 11, the supporting and connecting portion 103 may be regarded as a shape formed by jointing two trapezoids together. In the embodiment shown in FIG. 12, the supporting and connecting portion 103 may be regarded as a shape formed by jointing two semi-circles together.

With the supporting and connecting portion being configured to have a shape having a width gradually increasing from the center to both ends thereof connected to two adjacent strip-shaped protrusions, support forces applied at two lateral sides of the strip-shaped protrusion are more balanced, uniformity of thickness of the alignment film is further improved, and quality of printed alignment film is improved.

Figure 13:
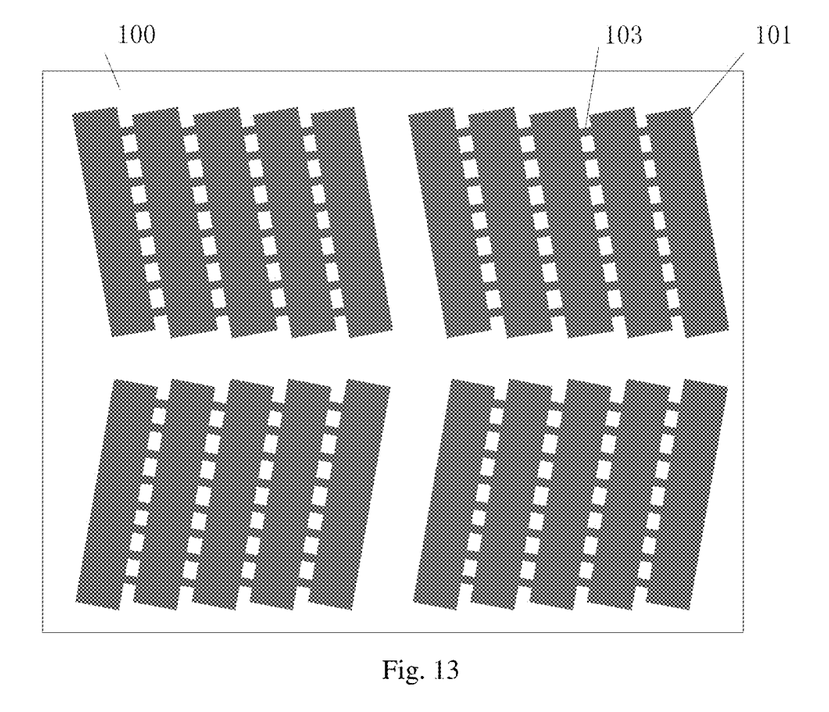
FIG. 13 is an illustrative structural drawing showing a transfer printing plate according to a sixth embodiment of the present disclosure.

FIG. 13 shows any two adjacent strip-shaped protrusions of a transfer printing plate according to a sixth embodiment of the present disclosure. However, a person of ordinary skills in the art could understand that the principle shown in FIG. 13 can be applied to each of the transfer printing portions and more strip-shaped protrusions. For the sake of simplification, detailed description of technical features in FIG. 13 that are identical to those of FIGS. 7 to 12 will be omitted. As shown in FIG. 13, the extending direction of the strip-shaped protrusion is not parallel with the direction perpendicular to the printing direction, an included angle is formed therebetween, and the included angle is an acute angle. The extending direction of the strip-shaped protrusion is not parallel with the printing direction either, an included angle is formed therebetween, that is, the extending direction of the supporting and connecting portion has a component in the printing direction.

Because different portions of strip-shaped protrusion will be stretched to different extents, the strip-shaped protrusion will be deformed such that uniformity of thickness of the alignment film becomes worse. While in the present embodiment, the strip-shaped protrusion extending in a direction having an inclined angle, which may overcome the problem of uniformity of thickness of the alignment film becoming worse, such that the uniformity of thickness of the alignment film may be further improved, and quality of the printed alignment film can be improved.

According to another aspect of the present disclosure, there is provided a transfer printing device, which may include the transfer printing plate according to any one of the above embodiments. The transfer printing device having such transfer printing plate may improve uniformity of thickness of the alignment film and improve quality of the printed alignment film.

It can be understood by a person of ordinary skills in the art that technical features in different embodiments may be combined.

It can be determined from the above technical solutions that the transfer printing plate and transfer printing device of the present disclosure have at least the following beneficial effects.

Compared with a conventional transfer printing plate having strip-shaped protrusions, the present disclosure provides that supporting and connecting portions are formed between adjacent strip-shaped protrusions. The supporting and connecting portions act as supports, which makes support forces applied at two lateral sides of the strip-shaped protrusion more balanced, such that thickness of edge portions of printed alignment film can be more uniform, uniformity of thickness of the alignment film is improved, quality of the print alignment film is improved, and Mura defects is alleviated;

The height of the supporting and connecting portions is equal to the height of the strip-shaped protrusions, which helps to balance the support forces applied at two lateral sides of the strip-shaped protrusion as much as possible, such that quality of printed alignment film is improved;

Two ends of supporting and connecting portion are connected to corners of the transfer printing section, the region between adjacent supporting and connecting portion corresponds to the non-display region of the mainboard of the display panel, not only uniformity of thickness of the alignment film is improved, but also the printed alignment film and the driving chip binding pins and the ET testing points do not interfere with each other, such that binding and testing of the display panel will not be influenced;

Through utilizing the supporting and connecting portion to extend and protect the corner of the strip-shaped protrusion, two ends of the strip-shaped protrusion corresponding to the corners of the display region can provide an increased area for transfer printing, a corner of a printed alignment film is enlarged, and the defect in displaying caused by the corner of the alignment film falling within the display region can be avoided;

The dummy protrusion makes the transfer printing plate much flatter in whole, and support forces for the strip-shaped protrusion become more balanced in whole, which helps to improve quality of the printed alignment film. Support forces applied at two lateral sides of the outmost strip-shaped protrusion become more balanced, quality of the printed alignment film is further improved, and Mura defect is alleviated;

With the supporting and connecting portion being configured to widen gradually from the center to both sides thereof, areas for supporting the strip-shaped protrusion are increased, such that support forces applied at two lateral sides of the strip-shaped protrusion are more balanced, uniformity of thickness of the alignment film is further improved, and quality of printed alignment film is improved; and The strip-shaped protrusion extends in a direction having an inclined angle, which may overcome the problem of uniformity of thickness of the alignment film becoming worse, such that the uniformity of thickness of the alignment film may be further improved, and quality of the printed alignment film can be improved.

Embodiments have been described in detail in conjunction with the drawings. With the description above, a person of ordinary skills may have a clear understanding of the transfer printing plate of the present disclosure.

Objects, technical solutions and beneficial effects of the present disclosure have been set forth in the above specific embodiments. It should be understand that those embodiments are only illustrative and do not intend to limit the scope of the present disclosure. All modifications, equivalent substitutions, improvements and the like without departing from the spirits and principles of the present disclosure shall falls within the scope of the present disclosure.

What is claimed is:

1. A transfer printing plate for transferring an alignment liquid to a mainboard of a display panel, comprising:
   a base plate;
   a transfer printing portion formed on the base plate and comprising at least two strip-shaped protrusions arranged side by side and spaced apart by a predetermined distance; and
   a supporting and connecting portion formed between two adjacent strip-shaped protrusions of the at least two strip-shaped protrusions and connected to the two adjacent strip-shaped protrusions;
   wherein one of the two adjacent strip-shaped protrusions is a protrusion configured to transfer the alignment liquid to the mainboard of the display panel, while the other one is a protrusion configured only to provide a supporting function; and
   wherein heights of the two adjacent strip-shaped protrusions in a direction perpendicular to the base plate are equal to each other.

2. The transfer printing plate according to claim 1, wherein in the transfer printing portion, a height of the supporting and connecting portion in a direction perpendicular to the base plate is equal to a height of the strip-shaped protrusion in the direction.

3. The transfer printing plate according to claim 1, wherein:
   a plurality of the supporting and connecting portions are formed between the two adjacent strip-shaped protrusions;
   each strip-shaped protrusion comprises a plurality of transfer printing sections arranged in a longitudinal direction of the strip-shaped protrusion; and
   a first end of each supporting and connecting portion is connected to a border between two adjacent transfer printing sections of one of the two adjacent strip-shaped protrusions.

4. The transfer printing plate according to claim 3, wherein a second end of each supporting and connecting portion is connected to a border between two adjacent transfer printing sections of the other one of the two adjacent strip-shaped protrusions; and
   wherein a region surrounded by the adjacent strip-shaped protrusions and adjacent supporting and connecting portions corresponds to a non-display region of the mainboard of the display panel.

5. The transfer printing plate according to claim 1, wherein the two adjacent strip-shaped protrusions comprise a first strip-shaped protrusion and a second strip-shaped protrusion; and
   the supporting and connecting portions comprise a first supporting and connecting portion formed between a corner at a first end of the first strip-shaped protrusion and a corner at one corresponding end of the second strip-shaped protrusion, and/or a second supporting and connecting portion formed between a corner at a second end of the first strip-shaped protrusion and a corner at the other corresponding end of the second strip-shaped protrusion.

6. The transfer printing plate according to claim 1, wherein each of the two adjacent strip-shaped protrusions is a protrusion configured to transfer the alignment liquid to the mainboard of the display panel.

7. The transfer printing plate according to claim 1, wherein
   an orthographic projection of the supporting and connecting portion on the base plate has a shape having a width gradually increasing from a center thereof to two ends thereof connected to the two adjacent strip-shaped protrusions.

8. The transfer printing plate according to claim 1, wherein an orthographic projection of the supporting and connecting portion on the base plate is rectangular.

9. The transfer printing plate according to claim 1, wherein an extending direction of the strip-shaped protrusions is perpendicular to a printing direction and an extending direction of the supporting and connecting portion is parallel with the printing direction.

10. The transfer printing plate according to claim 1, wherein an extending direction of the strip-shaped protrusions is not perpendicular to a printing direction and an extending direction of the supporting and connecting portion is at an angle with respect to the printing direction.

11. A transfer printing device, comprising a transfer printing plate, the transfer printing plate being configured for transferring an alignment liquid to a mainboard of a display panel and comprising:
   a base plate;
   a transfer printing portion formed on the base plate and comprising at least two strip-shaped protrusions arranged side by side and spaced apart by a predetermined distance; and
   a supporting and connection portion formed between two adjacent strip-shaped protrusions of the at least two strip-shaped protrusions and connected to the two adjacent strip-shaped protrusions;
   wherein one of the two adjacent strip-shaped protrusions is a protrusion configured to transfer the alignment liquid to the mainboard of the display panel, while the other one is a protrusion configured only to provide a supporting function; and
   wherein heights of the two adjacent strip-shaped protrusions in a direction perpendicular to the base plate are equal to each other.

12. The transfer printing device according to claim 11, wherein in the transfer printing portion, a height of the supporting and connecting portion in a direction perpendicular to the base plate is equal to a height of the strip-shaped protrusion in the direction.

13. The transfer printing device according to claim 11, wherein:
   a plurality of the supporting and connecting portions are formed between the two adjacent strip-shaped protrusions;
   each strip-shaped protrusion comprises a plurality of transfer printing sections arranged in a longitudinal direction of the strip-shaped protrusion; and
   a first end of each supporting and connecting portion is connected to a border between two adjacent transfer printing sections of one of the two adjacent strip-shaped protrusions.

14. The transfer printing device according to claim 13, wherein a second end of each supporting and connecting portion is connected to a border between two adjacent transfer printing sections of the other one of the two adjacent strip-shaped protrusions; and wherein a region surrounded by the adjacent strip-shaped protrusions and adjacent supporting and connecting portions corresponds to a non-display region of the mainboard of the display panel.

15. The transfer printing device according to claim 11, wherein the two adjacent strip-shaped protrusions comprise a first strip-shaped protrusion and a second strip-shaped protrusion;

the supporting and connecting portions comprise a first supporting and connecting portion formed between a corner at a first end of the first strip-shaped protrusion and a corner at one corresponding end of the second strip-shaped protrusion, and/or a second supporting and connecting portion formed between a corner at a second end of the first strip-shaped protrusion and a corner at the other corresponding end of the second strip-shaped protrusion.

16. The transfer printing device according to claim 11, wherein each of the two adjacent strip-shaped protrusions is a protrusion configured to transfer the alignment liquid to the mainboard of the display panel.

17. The transfer printing device according to claim 11, wherein an orthographic projection of the supporting and connecting portion on the base plate has a shape having a width gradually increasing from a center thereof to two ends thereof connected to the two adjacent strip-shaped protrusions.

18. The transfer printing device according to claim 11, wherein an orthographic projection of the supporting and connecting portion on the base plate is rectangular.

* * * * *